US012647539B2

(12) United States Patent
Gruber

(10) Patent No.: US 12,647,539 B2
(45) Date of Patent: Jun. 2, 2026

(54) METHOD AND APPARATUS FOR INTERACTION WITH AN INTELLIGENT PERSONAL ASSISTANT

(71) Applicant: Universal Electronics Inc., Scottsdale, AZ (US)

(72) Inventor: Brandon Gruber, San Marcos, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 5 days.

(21) Appl. No.: 18/419,117

(22) Filed: Jan. 22, 2024

(65) Prior Publication Data

US 2024/0163405 A1 May 16, 2024

Related U.S. Application Data

(62) Division of application No. 17/729,673, filed on Apr. 26, 2022, now Pat. No. 11,882,388, which is a division of application No. 15/475,528, filed on Mar. 31, 2017, now Pat. No. 11,323,665.

(51) Int. Cl.
| | |
|---|---|
| *H04N 7/18* | (2006.01) |
| *G02B 17/06* | (2006.01) |
| *G06F 3/16* | (2006.01) |
| *G06N 3/008* | (2023.01) |
| *G06N 5/02* | (2023.01) |

(52) U.S. Cl.
CPC ............. *H04N 7/183* (2013.01); *G02B 17/06* (2013.01); *G06F 3/167* (2013.01); *G06N 3/008* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 6,304,285 | B1 | 10/2001 | Geng |
| 6,965,394 | B2 | 11/2005 | Gutta |
| 7,091,471 | B2 | 8/2006 | Wenstrand |
| 11,323,665 | B2 | 5/2022 | Gruber |
| 2006/0023105 | A1 | 2/2006 | Kostrzewski |
| 2008/0031475 | A1 | 2/2008 | Goldstein |
| 2008/0167868 | A1 | 7/2008 | Kanevsky |

(Continued)

OTHER PUBLICATIONS

Apple HomePod guide: Everything you need to know about the Siri smart speaker, https://www.wareable.com/apple/apple-homepod-release-date-price-features-355, 8 pages, retrieved Aug. 30, 2017.

(Continued)

*Primary Examiner* — Christopher G Findley
(74) *Attorney, Agent, or Firm* — Greenberg Traurig, LLP

(57) ABSTRACT

Aspects of the present invention are directed towards a more natural way to interact with an intelligent personal assistant. An intelligent personal assistant comprises a camera that provides images of an area surrounding the assistant. The assistant monitors images provided by the camera to determine when a user is addressing the assistant. When voice input is received after determining that a user is addressing the assistant, the assistant understands that the voice input is intended for the assistant, and acts on the voice input to respond to the user.

10 Claims, 8 Drawing Sheets

(56) References Cited

U.S. PATENT DOCUMENTS

| 2012/0232906 | A1 | | 9/2012 | Lindahl | |
|---|---|---|---|---|---|
| 2015/0154001 | A1 | * | 6/2015 | Knox | G06F 3/017 |
| | | | | | 345/156 |
| 2015/0269943 | A1 | | 9/2015 | Vanblon | |
| 2016/0179462 | A1 | | 6/2016 | Bjorkengren | |
| 2016/0283778 | A1 | | 9/2016 | Karakotsios | |
| 2018/0082682 | A1 | * | 3/2018 | Erickson | G10L 15/30 |
| 2018/0088969 | A1 | | 3/2018 | Vanblon | |

OTHER PUBLICATIONS

Examination report issued on European patent application No. 18774772.0, dated Jun. 21, 2021, 8 pages.
Extended European search report issued on European patent application No. 18774772.0, dated Oct. 20, 2020, 11 pages.
Ghosh et al., Real Time Eye Detection and Tracking Method for Driver Assistance System, 14 pages, copyright 2015.
Google Home manual, https://support.google.com/googlehome/answer/7055908?hl=en, 4 pages, retrieved Aug. 30, 2017.
Haro et al., Eye Detection and Tracking, http://www.cc.gatech.edu/cpl/projects/pupil/, 2 pages, retrieved Aug. 31, 2017.
Hosek, Android eye detection and tracking with OpenCV, http://romanhosek.cz/android-eye-detection-and-tracking- with--opencv/, 31 pages, retrieved Aug. 31, 2017.
International Search Report and Written Opinion issued on PCT application No. US18/23679, dated Jun. 1, 2018, 19 pages.

* cited by examiner

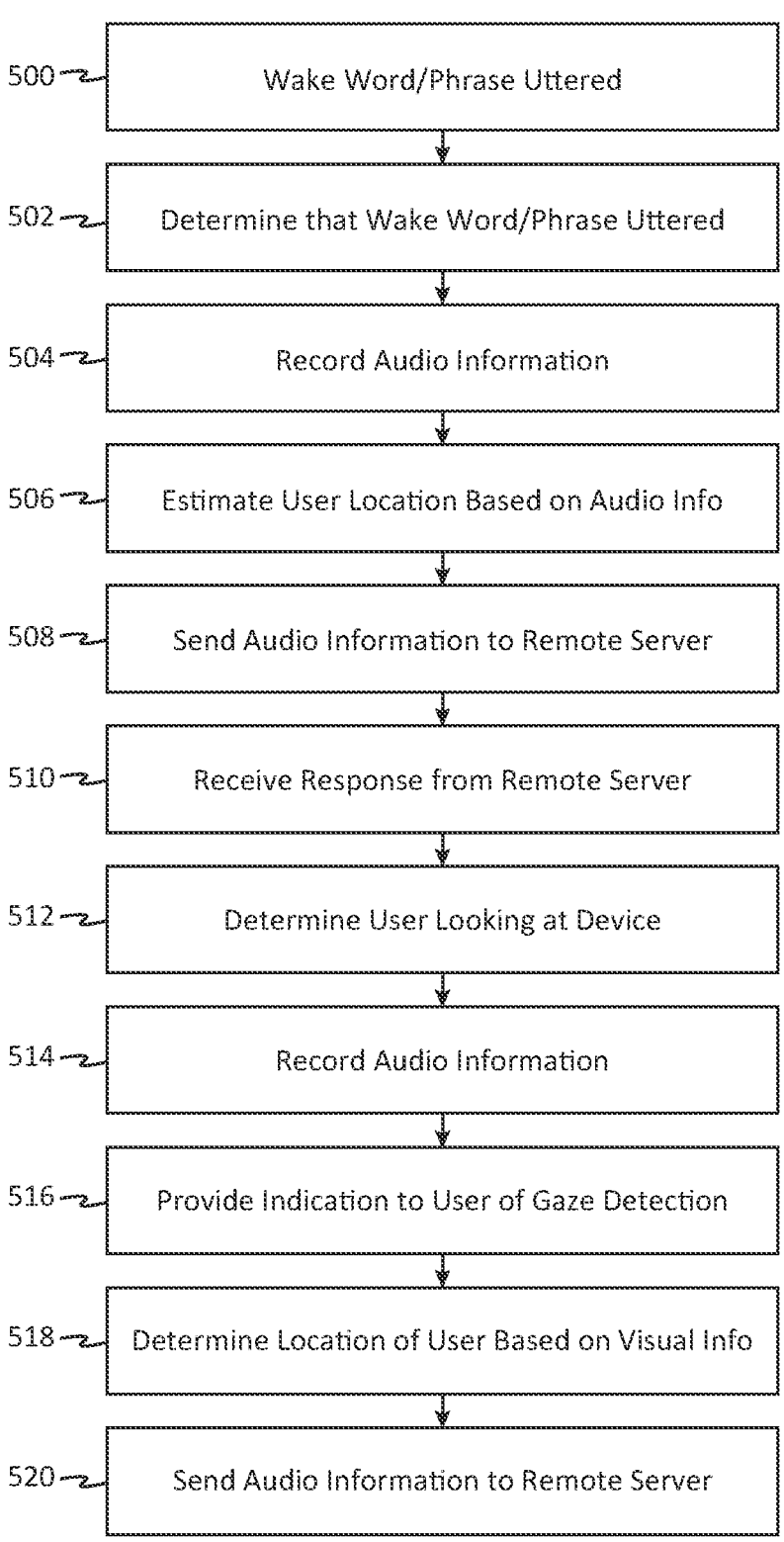

500 — Wake Word/Phrase Uttered

502 — Determine that Wake Word/Phrase Uttered

504 — Record Audio Information

506 — Estimate User Location Based on Audio Info

508 — Send Audio Information to Remote Server

510 — Receive Response from Remote Server

512 — Determine User Looking at Device

514 — Record Audio Information

516 — Provide Indication to User of Gaze Detection

518 — Determine Location of User Based on Visual Info

520 — Send Audio Information to Remote Server

FIG. 5

600 — Determine User Looking at Device

602 — Determine User Location Based on Visual Info

604 — Record Audio Information

606 — Estimate location of User Based on Visual Info

608 — Provide Indication to User of Gaze Detection

610 — Send Audio Information to Remote Server

612 — Receive Response from Remote Server

614 — Determine User Looking at Device

700 — Determine if Wake Word/Phrase Spoken

702 — Estimate User Location

704 — Monitor Digitized Visual Information

706 — Determine Location of Speaker

708 — Provide Feedback to Speaker

710 — Record Audio

712 — Send Audio Recording to Server

714 — Receive Response from Server

716 — Repeat Blocks 700 – 714

METHOD AND APPARATUS FOR INTERACTION WITH AN INTELLIGENT PERSONAL ASSISTANT

CROSS-REFERENCE TO RELATED APPLICATIONS

The present application is a divisional of U.S. patent application Ser. No. 17/729,673, filed on Apr. 26, 2022, which is a divisional of U.S. patent application Ser. No. 15/475,528, filed on Mar. 31, 2017, now U.S. Pat. No. 11,323,665.

BACKGROUND

Field of Use

The present application relates generally to the home automation and control arts. More specifically, embodiments of the present invention relate to interactions with intelligent personal assistants.

Description of the Related Art

Intelligent personal assistants are becoming commonplace in today's homes. Products such as Amazon's Echo, Google's Google Home, and Apple's Siri are all examples of these assistants. Typically, such assistants are installed at home, coupled to an existing home Wi-Fi network and placed in a convenient location where they may be used most frequently, such as in a family room or kitchen.

Generally, each device listens for a wake word to be spoken, such as "Alexa" for Amazon's Echo and "OK Google" for Google's Home device, followed by a question or a command. The question is typically sent over the Internet to a voice recognition server that interprets the question or command and provides a response that is sent back over the internet for verbal playback via a speaker that is typically integrated into each device, or causing some action to occur, such as lighting lights, playing music, etc.

One of the drawbacks of these assistants is that the wake word must be spoken each time a new question or command is asked by a user. This can become annoying, especially when a series of questions or commands are asked in succession.

It would be desirable to eliminate the need to utter the wake word every time a question is posed to such assistants.

SUMMARY

Embodiments of the present invention are directed towards a more natural way to interact with an intelligent personal assistant. In one embodiment, an intelligent personal assistant comprises an audio transducer (such as one or more microphones) for receiving audio input from an area near the intelligent personal assistant, a memory for storing processor-executable instructions, a camera for providing images of an area around the intelligent personal assistant, a user output for providing audible responses to voice input submitted by a user, a network interface, and a processor coupled to the audio transducer, the memory, the camera the network interface, and the user output, for executing the processor-executable instructions that causes the intelligent personal assistant to determine, by the processor via images provided by the camera, that the user is addressing the intelligent personal assistant, after determining that the user is addressing the intelligent personal assistant, receive, by the processor via the audio transducer, a first signal representative of a first voice input, and provide, by the processor via the network interface, the first signal to a remote server for processing the first signal when the processor determines that the user has addressed the intelligent personal assistant immediately prior to receiving the first voice input.

In another embodiment, a method is described for interacting with an intelligent personal assistant, comprising receiving, by a processor coupled to a digital camera, digital images of an area around the intelligent personal assistant, determining, by the processor from the digital images, that the user is addressing the intelligent personal assistant, after determining that the user is addressing the intelligent personal assistant, receiving, by the processor via an audio transducer, a first signal representative of a first voice input, and providing, by the processor via the network interface, the first signal to a remote server for processing the first signal when the processor determines that the user has addressed the intelligent personal assistant immediately prior to receiving the first voice input.

In yet another embodiment, an intelligent personal assistant comprises a audio transducer for receiving voice input from a user, a memory for storing processor-executable instructions and a wake word, a camera for providing images of an area around the intelligent personal assistant, a user output for providing audible responses to the voice input, a network interface, and a processor coupled to the audio transducer, the memory, the camera the network interface, and the user output, for executing the processor-executable instructions that causes the intelligent personal assistant to receive, by the processor via the audio transducer, a first signal representative of a first voice input from the user, determine, by the processor, that the first signal comprises the wake word stored in the memory, provide, by the processor via the network interface, at least a portion of the first signal to a remote server, receive, by the processor via the network interface, a response from the remote server, provide, by the processor via the user output, the response, receive, by the processor via the audio transducer, a second signal representative of a second voice input from the user, determine, by the processor via images provided by the camera, that the user is addressing the intelligent personal assistant, after determining that the user is addressing the intelligent personal assistant, receive, by the processor via the audio transducer, a second signal representative of a second voice input, and provide, by the processor via the network interface, the second signal to the remote server for processing the second signal when the processor determines that the user has addressed the intelligent personal assistant within a predetermined time period from receiving the first signal.

In yet another embodiment, a method for interacting with an intelligent personal assistant is described, comprising receiving, by a processor coupled to an audio transducer, a first signal representative of a first voice input from the user, determining, by the processor, that the first signal comprises a wake word stored in the memory, providing, by the processor via a network interface, at least a portion of the first signal to a remote server, receiving, by the processor via the network interface, a response from the remote server, providing, by the processor to a user output, the response, receiving, by the processor via the audio transducer, a second signal representative of a second voice input from the user, determining, by the processor via images provided by the camera, that the user is addressing the intelligent personal assistant, after determining that the user is addressing the intelligent personal assistant, receiving, by the processor via the audio transducer, a second signal representative of a second voice input, and providing, by the processor via the network interface, the second signal to the remote server for processing the second signal when the processor determines that the user has addressed the intelligent personal assistant within a predetermined time period from receiving the first signal.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein:

FIG. 2b is a perspective view of an alternative embodiment of the intelligent personal assistant shown in FIG. 2a;

FIG. 5 is a flow diagram of one embodiment of a method, performed by an intelligent personal assistant as shown in FIG. 1, 2a, 2b, or 3, for interacting with a user in a more natural manner;

DETAILED DESCRIPTION

Embodiments of the present invention are directed towards a more natural way to interact with an intelligent personal assistant, by reducing or eliminating the need to utter a wake word or phrase.

Figure 1:
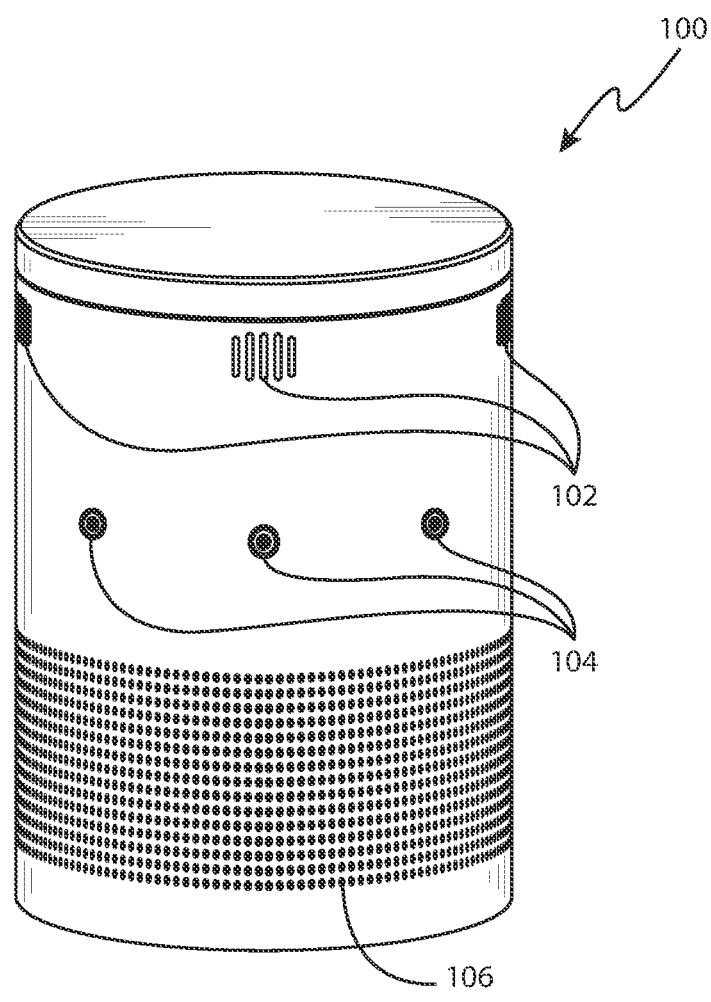
FIG. 1 is a perspective view of one embodiment of an intelligent personal assistant in accordance with the teachings herein.

FIG. 1 is a perspective view of one embodiment of an intelligent personal assistant 100, shown as a cylindrical unit comprising several cameras having camera lenses 102, several audio transducers 104 and a speaker 106 supported by amplification circuitry. The assistant 100 monitors for audio input received in a vicinity of the intelligent personal assistant in order to determine when a wake word or phrase is spoken (in one embodiment) and in order to provide audio information to a remote server for determining a question or a command from a user. Responses to questions are provided audibly by the intelligent personal assistant through speaker 106, as well as playing music. The intelligent personal assistant further comprises wireless networking circuitry to connect to a local area network and on to the Internet for communication with the remote server. Other uses for intelligent personal assistant 100 comprises ordering products, and controlling things such as lights, thermostats, security systems, etc. The intelligent personal assistant 100, in this embodiment, can determine when a user is addressing the assistant, so that the use of wake words and phrases can be minimized or eliminated entirely.

The remote server may provide Alexa Voice Services (AVS) to the intelligent personal assistant, which is a service offered by Amazon that analyzes audio information to determine if human speech is present in the audio information provided by the intelligent personal assistant, to interpret the speech, and to provide responses to the speech back to the assistant 100 over the Internet. Generally, the assistant 100 constantly listens for a wake word or phrase that must be spoken by a user in order to activate the assistant. For example, Amazon's Echo uses the wake word, "Alexa", while Google Home uses the wake phrase "Ok Google". When the assistant 100 determines that the wake word has been uttered, it records the next few seconds of audio information provided by the audio transducer(s) and then provides the recording to the remote server for processing. In prior art assistants, the wake word must be spoken each time an interaction with the assistant was desired. This typically becomes annoying after a series of interactions with the assistant.

In order to minimize or completely eliminate the need for a wake word, in one embodiment, assistant 100 utilizes one or more cameras 102 to determine when a user is addressing the intelligent personal assistant. The camera generates digital images and/or video and provides it to a processor that determines whether someone is addressing the assistant 100, for example, whether someone is addressing the assistant 100, for example by looking or "gazing" at assistant 100, and, in one embodiment, whether someone is looking or gazing at assistant 100 for more than a predetermined time period (such as two seconds), or, in another embodiment, whether someone is looking or gazing at assistant 100 as human speech is being received by the assistant. In one embodiment, the processor does not process the digital images/video, but rather provides this information from the camera(s) to a remote server for processing, much the same way that it provides audio information to a remote server.

In one embodiment, after the assistant 100 determines that a wake word has spoken, assistant 100 records a sample of following audio input received by the audio transducer(s) and provides the sample to the remote server, as well-known in the art. However, the wake word may additionally cause the intelligent digital assistant to begin processing digital images provided by the camera to determine if any follow-on voice input is provided by a user while the user looks at assistant 100. When further voice input is received as a user looks at assistant 100, assistant 100 records the voice input and sends it to the remote server for processing. A conversation between a user and assistant 100 may comprise multiple questions posed by a user in order to receive an acceptable answer. For example, the following exchange may occur:

> User: "Alexa, what is the weather going to be like tomorrow?"
> Echo: It will be 86 degrees and sunny tomorrow.
> User: "How hot will it be at 6 pm?"
> Echo" It will be 80 degrees at 6 pm tomorrow.
> User: "Is there any chance of rain at all?
> Echo: No, there is no chance of rain tomorrow at all.

As one can see, the above exchange is much more natural than having to speak the wake word each time a question is posed to assistant 100.

In another embodiment, a wake word is not used at all. In this embodiment, assistant 100 continuously monitors the area surrounding assistant 100 via the one or more cameras 102. When intelligent personal assistant 100 determines that a user is looking or gazing at assistant 100, assistant 100 begins recording audio information from the audio transducer(s), generally for a predetermined time period, such as five seconds, and then sends the audio recording to the remote server. Further verbal input from the user may be recorded and sent to the remote server any time that assistant 100 determines that a user is looking or gazing at assistant 100. Thus, a very natural "conversation" may be had between a user and assistant 100 without the use of a wake word or phrase.

In yet another embodiment, assistant 100 monitors both audio input from two or more audio transducers and digital images/video from the camera to determine when a user is attempting to communicate with assistant 100. In this embodiment, assistant 100 comprises two or more audio transducers, and typically a series of audio transducers formed along a circumference of assistant 100, in order to provide directionality to the audio input. Then, processing circuitry can determine an approximate location of a user as the user speaks to assistant 100. This can aid in determining whether the same user is still speaking to assistant 100. For example, assistant 100 may listen to audio input provided by eight audio transducers located around a circumference of assistant 100. When assistant 100 determines that a user is looking or gazing at assistant 100 for more than three seconds, assistant 100 records a sample of the audio input received by one or more of the audio transducers after determining that a user is looking or gazing at assistant 100. Assistant 100 additionally determines that the user is located approximately in alignment with audio transducer number seven of the eight audio transducers. This may be determined by measuring a signal strength of the audio provided by each of the audio transducers, and determining a user location using the strongest signal, or the top two or three strongest signals from adjacent audio transducers. Then, when assistant 100 again determines that someone is looking or gazing at assistant 100, assistant 100 determines whether the person looking at assistant 100 is in the same location as the previous determination. If so, assistant may use this information to better determine whether someone is addressing assistant 100 or not.

It should be understood that the number, type and arrangement of the camera lenses 102, audio transducers 104 and speaker 106 could be different than what is shown in FIG. 1. In some embodiments, however, it is advantageous to have some physical correspondence between the camera lenses 102 and the audio transducers 104, as will be explained later herein.

Figure 2A:
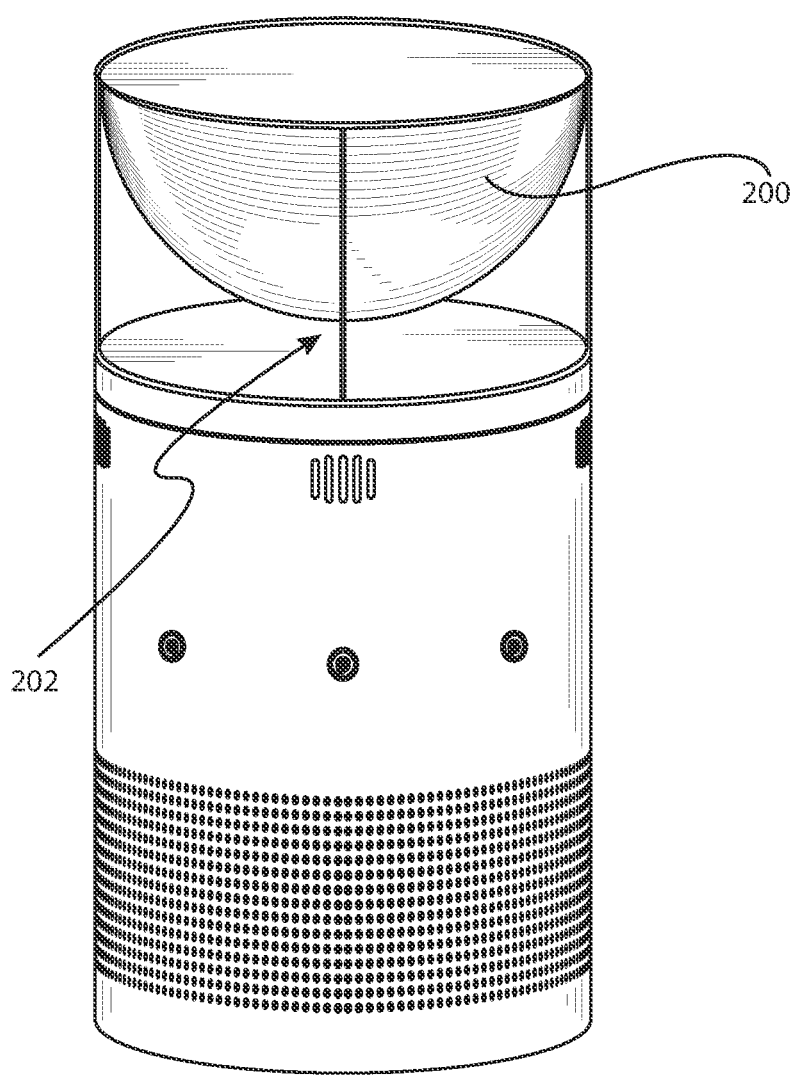
FIG. 2a is a perspective view of another embodiment of the intelligent personal assistant shown in FIG. 1.

FIG. 2a is a perspective view of another embodiment of the intelligent personal assistant 100 shown in FIG. 1. In this embodiment, intelligent personal assistant 100 is shown comprising a reflective convex surface 200 located at the top of the unit, in this embodiment shaped as a hemisphere or half-dome. A single camera is housed within intelligent personal assistant 100 pointing upwards toward an apex 202 of surface 200. Surface 200 is shown mounted to three mounting posts along a circumference, however, in other embodiments, it may be mounted using more, or fewer, mounting posts, and that in one embodiment, a single mounting post may be used, coupled to apex 202 and extending downwardly to the camera lens. In yet another embodiment, the circumference of the dome could be supported by a clear, cylinder, so that nothing obstructs light being reflected off of the dome. Surface 200 is manufactured from any material that reflects light, such as metal or a mirrored surface, and is shaped to reflect light in an area surrounding the assistant 100 towards the camera. Thus, the camera is able to "see" in a 360 degree view around assistant 100.

Operation of this embodiment is similar to that described with respect to FIG. 1, except that the only source of visual information is from the single camera.

Figure 2B:
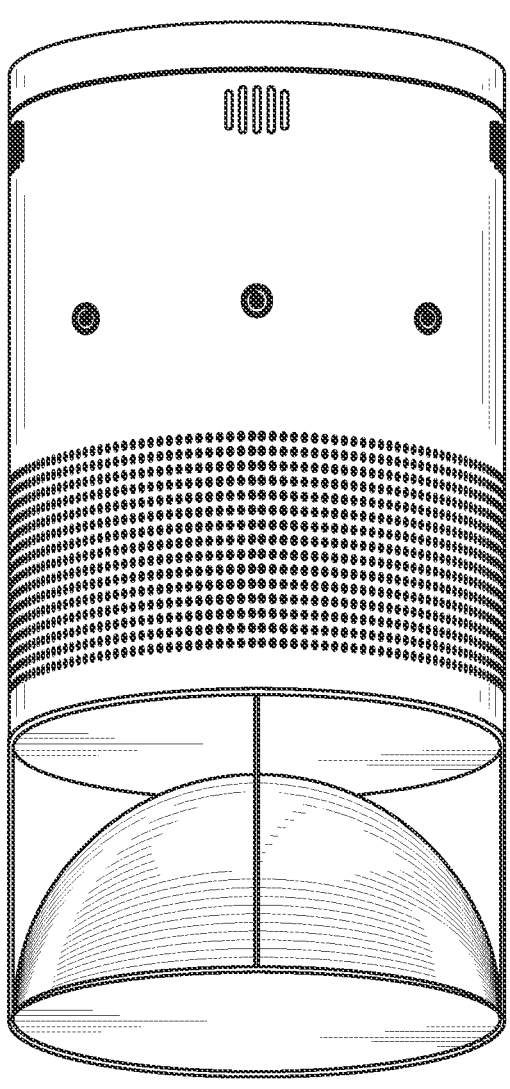

FIG. 2b is a perspective view of an alternative embodiment of the intelligent personal assistant shown in FIG. 2a. The intelligent personal assistant in this embodiment generally comprises the same components as intelligent personal assistant 100, except that reflective surface 200 is located near the bottom of the assistant, rather than the top, and the camera located inside of the assistant is pointing down towards surface 200.

Figure 3:
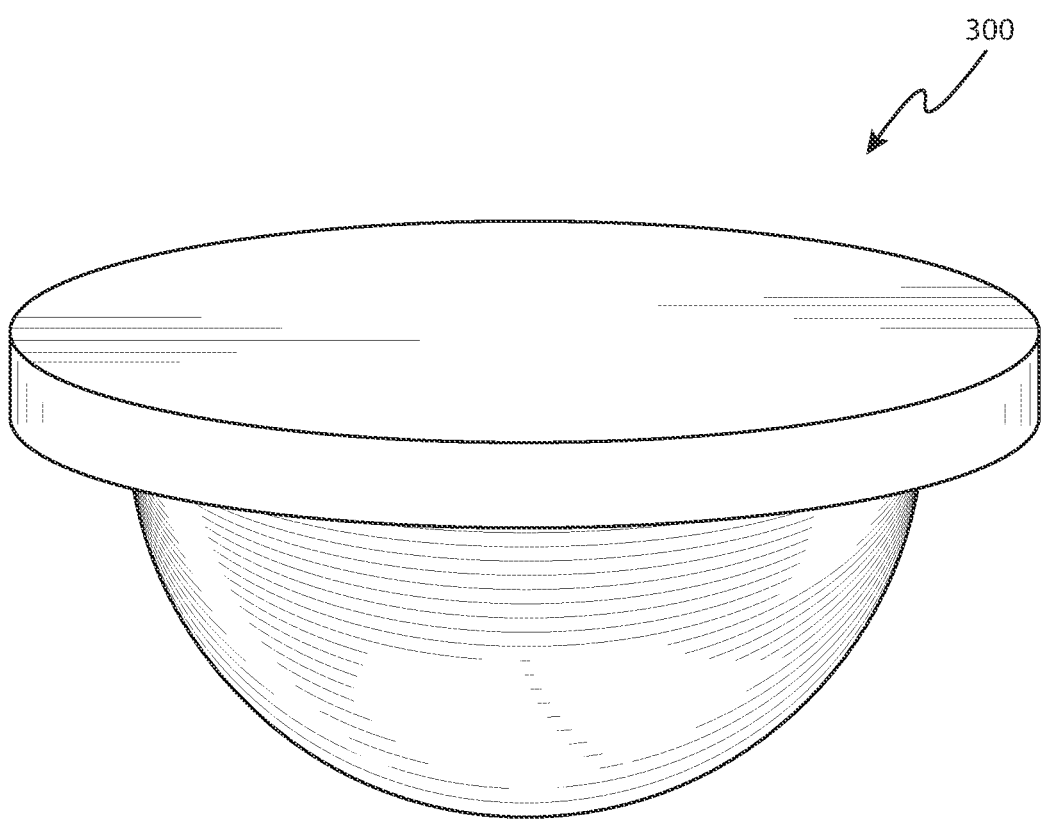
FIG. 3 is a perspective view of yet another embodiment of the intelligent personal assistant as shown in FIG. 1.

FIG. 3 is a perspective view of yet another embodiment of the intelligent personal assistant as shown in FIG. 1, this time an intelligent personal assistant 300 fashioned as a ceiling-mounted unit. As in the other embodiments, assistant 300 comprises one or more audio transducers for receiving audio input, a speaker for providing audio responses and one or more cameras. In one embodiment, a convex surface is not used, as the camera may be capable of receiving light directly from all or a great majority of the area surrounding assistant 300. In one embodiment, the camera comprises a fish-eye lens.

Figure 4:
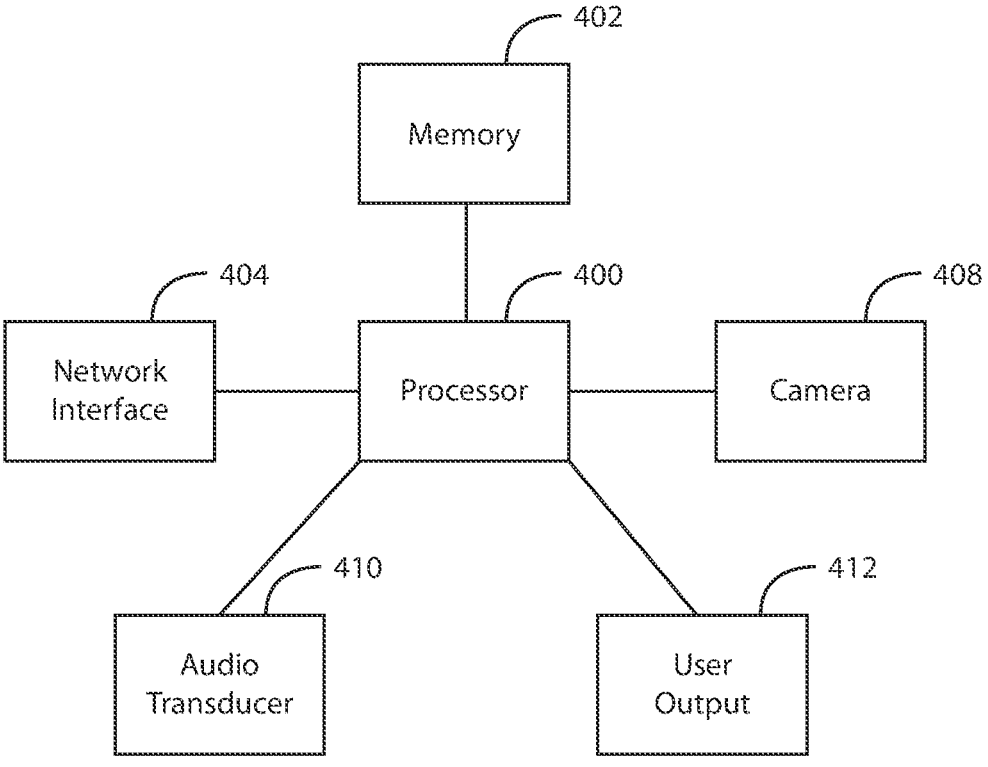
FIG. 4 is a functional block diagram of one embodiment of the intelligent personal assistants as shown in FIG. 1, 2a, 2b, or 3.

FIG. 4 is a functional block diagram of one embodiment of the intelligent personal assistants as shown in FIGS. 1, 2a and 2b. The same functional components are also used in the embodiment shown in FIG. 3, with the reflective surface omitted. FIG. 4 shows processor 400, memory 402, network interface 404, one or more audio transducers 406, one or more digital cameras 408, reflective surface 410 and user output 412. It should be understood that in some embodiments, some functionality has been omitted for purposes of clarity, such as a power supply.

Processor 400 comprises one or more general-purpose microprocessors, microcontrollers and/or custom or semi-custom ASICs, and/or discrete components able to carry out the functionality required for operation of the intelligent personal assistant. Processor 400 may be selected based on processing capabilities, power-consumption properties, and/or cost and size considerations. In the case of a microprocessor, microcontroller, or ASIC, processor 400 generally executes processor-executable instructions stored in memory 402 that control the functionality of the intelligent personal assistant. Examples of memory include one or more electronic memories such as RAM, ROM, hard drives, flash memory, EEPROMs, UVPROMs, etc. or virtually any other type of electronic, optical, or mechanical memory device, but excludes propagated signals.

Network interface 404 comprises circuitry necessary to transmit and receive digitized data packets comprising audio recordings from the one or more audio transducers 406 and/or visual recordings received by camera 410, between the intelligent personal assistant and a remote server over the Internet or other wide-area network, either directly or through a local network such as a router, modem, gateway, security panel, or other home-networked device(s). Such circuitry is well known in the art and may comprise BlueTooth, Wi-Fi, or RF circuitry, among others.

One or more audio transducers 406 comprise one or more devices used to convert sound pressure into electronic signals for use by processor 400. An example of such audio transducers are piezo-electric microphones, selected due to their inexpensive cost and small size. Another example are mems microphones.

Digital camera(s) 408 comprises a device that converts light into electronic signals and provides the electronic signals to processor 400. A wide variety of inexpensive, high-quality cameras are available on the market today. As used herein, the term "camera" can mean, simply, a lens and an image sensor in combination. Such sensors are typically CMOS devices, and offer enough resolution to distinguish facial features at a distance of up to ten feet or more.

Reflective surface 410 comprises a spherical structure with a reflective coating or made from reflective material, to allow camera to view 360 degrees around an intelligent personal assistant. In one embodiment, reflective surface 410 comprises a sphere, which may add to the aesthetic appearance of the intelligent personal assistant. Camera 408 is positioned either below or above reflective surface 410, pointed directly upwards, or downwards, depending on implementation, towards reflective surface 410, which enables camera 408 to receive light reflected from around the assistant in 360 degrees.

User output 412 comprises a speaker and related electronics and/or a video display for providing answers to users' questions or status information to a user. For example, a user may ask an intelligent personal assistant what the weather will be like the following day. In response, the intelligent personal assistant may audibly inform the user, via a speaker, that rain is likely in the forecast. In another example, if a user asks the intelligent personal assistant to play a particular song, and the intelligent personal assistant may play the song for the user via a speaker. If the user output additionally comprises a video display, the video display may indicate the song name, performer, album name, or other information related to the song.

FIG. 5 is a flow diagram of one embodiment of a method, performed by an intelligent personal assistant, for interacting with a user in a more natural manner. It should be understood that the steps described in this method could be performed in an order other than what is shown and discussed and that some minor method steps may have been omitted for clarity and simplicity.

At block 500, a user of intelligent personal assistant in the vicinity of the intelligent personal assistant utters a wake word or phrase that is received by the one or more microphones and converted into an electronic signal representative of the wake work or phrase.

At block 502, processor 400 receives digitized audio information from the one or more microphones on the intelligent personal assistant and determines that the wake word or phrase was uttered by comparing the digitized audio information electronic to a wake word or phrase stored in memory 402, using techniques well-known in the art.

At block 504, in response to determining that a user uttered the wake word or phrase, processor 400 begins recording audio information from the one or more microphones and stores the audio information in memory 402. Typically, the audio information will comprise a question or a command from the user. The audio recording is generally terminated by processor 400 after a predetermined time period, such as five seconds, or upon determination by processor 400 that the user has stopped speaking, using techniques well-known in the art.

At block 506, processor 400 may estimate a location of the user in relation to the intelligent personal assistant using the audio information. For example, the intelligent personal assistant may comprise eight microphones lining a circumference of the intelligent personal assistant, each spaced equally apart from one another. Processor 400 may determine a signal strength of the audio information provided by each microphone, and use this information to determine a location of the user based on the strongest signal(s) from one or more of the microphones. For example, if microphone number 5 produced the strongest signal while either the wake word/phrase was spoken, or during a subsequent audio recording following detection of the wake word/phrase, processor 400 may conclude that the user is in an area adjacent to microphone number 5 or along an acoustic trajectory away from microphone number 5. In other embodiments, well-known microphone beamforming techniques may be used to estimate the location of a user.

At block 508, processor 400 causes the audio recording to be sent from memory 402 to a remote server via network interface 404, to determine whether the audio recording contains human speech and, if so, what the user has said, again using techniques well-known in the art. In another embodiment, the audio recording is processed locally by processor 400.

At block 510, the remote server then sends a response back to the intelligent personal assistant with an audible response and/or it provides a command to another cloud-based server for an action to occur at the location of the intelligent personal assistant. For example, if the user's voice recording was interpreted by the remote server to "turn on the kitchen lights", the remote server may send a command to another server via the Internet that is capable of remotely controlling the kitchen lights at the user's home. When the other server receives the command, it in turn sends a signal over the wide-area network to a control device inside the home for the device to turn the kitchen lights on. In an embodiment where processing is performed locally by processor 400, the response is provided by processor 400 to user output 412, in the case of an audible response or, in the case of causing an action to occur in the user's home, sends a signal to one or more networked home automation controllers or devices, to perform such actions such as turn on/off lights, set a thermostat, order goods online, etc.

At block 512, after a response has been provided to the user, visual information from the camera is evaluated in order to determine if the user, or someone else, is looking, or "gazing" at the intelligent personal assistant. In one embodiment, visual information is evaluated only for a predetermined time after the wake word or phrase was uttered, or within a predetermined time from when a response to the user's request or command following the wake word or phrase was provided. This embodiment utilizes the fact that a user is more likely to have a follow-on question or command immediately after receiving a response to his or her initial question or command, and that the user is likely looking at the intelligent personal assistant when a follow-up question or command is given.

In one embodiment, digital video and/or still images from the camera are evaluated by processor 400 to determine whether someone is looking or gazing at the intelligent personal assistant. In another embodiment, processor 400 causes the digital video and/or still images from the camera to be sent via network interface 404 to the same, or a different, server that processed the audio recording sent at block 510, in order to evaluate the visual information from camera 408. In either case, a determination may be made by determining whether two eyes and a mouth, representative of the presence of a person in the vicinity of the intelligent personal assistant, are present in the visual information. In one embodiment, an inverse function related to a curvature of the convex surface is applied by processor 400, or the remote server, to the digital information from camera 408 to eliminate or reduce visual distortion caused by curvature of the convex surface.

When the remote server determines that someone is looking or gazing at the intelligent personal assistant, the remote server sends a signal to the intelligent personal assistant via the Internet and network interface 404. In one embodiment, determining whether someone is looking or gazing at intelligent personal assistant comprises determining that someone is looking or gazing for more than a predetermined time period, such as two seconds. This makes it more likely that someone is intending to interact with the intelligent personal assistant, verses merely glancing at the intelligent personal assistant.

At block 514, when processor 400 determines, or is notified by the remote server, that someone is looking or gazing at the intelligent personal assistant, and in one embodiment, for more than a predetermined time period, processor 400 begins recording audio information from the one or more microphones and stores the audio information in memory 402. The recording is generally terminated by processor 400 after a predetermined time period, such as five seconds. In one embodiment, recording is stopped when processor 400 determines that someone has stopped speaking, using techniques well-known in the art. This may be used in conjunction with a predetermined time period. For example, the recording may be stopped upon detection that someone stopped speaking or a predetermined time period, whichever comes first. In one embodiment, the recording continues only for as long as the personal intelligent assistant is being addressed.

At block 516, also in response to determining that someone is looking or gazing at the intelligent personal assistant, processor 400 may provide an indication to the user that the intelligent personal assistant has determined that the user is looking or gazing at the intelligent personal assistant, in order to provide feedback to the user that the user's gaze has been acknowledged by the intelligent personal assistant. Knowing this, a user may pause to receive the indication before speaking to the intelligent personal assistant. The indication may comprise, simply, of illuminating an LED located on top of the intelligent personal assistant, for example.

At block 518, also in response to determining that someone is looking or gazing at the intelligent personal assistant, processor 400 may determine a location of the user in relation to the intelligent personal assistant using the visual information. For example, the intelligent personal assistant may comprise eight lenses lining a circumference of the intelligent personal assistant, each spaced equally apart from one another. Processor 400 may determine that two eyes and a mouth are present in signals provided by lenses 3 and 4. Thus, processor 400 may determine that the user is located along a line of sight of both lenses 3 and 4. In an embodiment where a reflective surface is used in conjunction with a single camera, the executable code that processes the images from the camera can comprise instructions that can determine a location of the user in relation to the intelligent personal assistant, based on, for example, a detection of two eyes and a mouth at a point along the 360 degrees of view.

At block 520, processor 400 causes the audio recording at block 514 to be sent from memory 402 to the remote server via network interface 404, to determine whether any human speech was uttered and, if so, what the user has said. In another embodiment, processing is conducted locally by processor 400.

In one embodiment, processor 400 sends the audio recording to the remote server only when the estimated user location determined by the visual information matches the estimated user location determined by the audio information when the key word/phrase was spoken. This helps ensure that a follow-up question or command is being spoken from the user who provided the original question/command in block 504, rather than a false signal as a result of someone else simply looking at the intelligent personal assistant.

Figure 6:
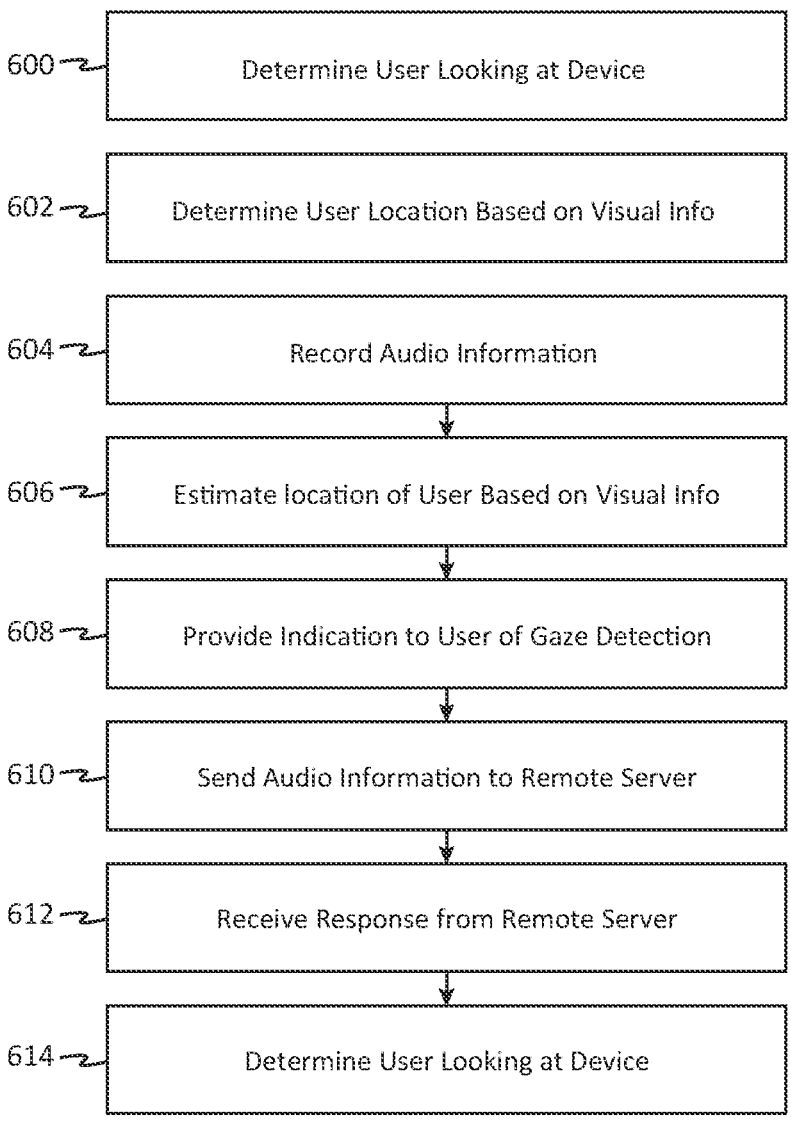
FIG. 6 is a flow diagram of another embodiment of a method, performed by an intelligent personal assistant as shown in FIG. 1, 2a, 2b, or 3, for interacting with a user in a more natural manner, without the use of wake words or phrases.

FIG. 6 is a flow diagram of another embodiment of a method, performed by an intelligent personal assistant, for interacting with a user in a more natural manner, without the use of wake words or phrases. It should be understood that the steps described in this method could be performed in an order other than what is shown and discussed and that some minor method steps may have been omitted for clarity and simplicity.

At block 600, processor 400 monitors digitized visual information from digital camera 408 to determine if anyone is looking or gazing at the intelligent personal assistant. In one embodiment, the digitized visual information comprises digital video and/or still images from the camera that are evaluated by processor 400. In another embodiment, processor 400 causes the digitized visual information from the camera to be sent via network interface 404 to the same, or a different, server that processed the audio recording sent at block 510, in order to evaluate the visual information from camera 408.

In one embodiment, processor 400 performs an inverse function related to a curvature of the convex surface to the digitized visual information from camera 408 to eliminate or reduce visual distortion caused by curvature of the convex surface.

When the remote server determines that someone is looking or gazing at the intelligent personal assistant, the remote server sends a signal to the intelligent personal assistant via the Internet and network interface 404. In one embodiment, determining whether someone is looking or gazing at intelligent personal assistant comprises determining that someone is looking or gazing for more than a predetermined time period, such as two seconds. In any case, a determination that someone is looking or gazing at the intelligent personal assistant may be made by determining whether two eyes and a mouth, representative of the presence of a person in the vicinity of the intelligent personal assistant, are present in the digitized visual information.

At block 602, processor 400 may determine a location of the user in relation to the intelligent personal assistant using the digitized visual information, as explained above with respect to the method illustrated in FIG. 5.

At block 604, when processor 400 determines, or is notified by the remote server, that someone is looking or gazing at the intelligent personal assistant, and in one embodiment, for more than a predetermined time period, processor 400 begins recording audio information from the one or more microphones and stores the audio information in memory 402. The recording is generally terminated by processor 400 after a predetermined time period, such as five seconds. In one embodiment, recording is stopped when processor 400 determines that someone has stopped speaking, using techniques well-known in the art. This may be used in conjunction with a predetermined time period. For example, the recording may be stopped upon detection that someone stopped speaking or a predetermined time period, whichever comes first. In one embodiment, the recording continues only for as long as the personal intelligent assistant is being addressed.

At block 606, processor 400 may estimate a location of the person who is addressing the intelligent personal assistant, as described above in the description to the method illustrated in FIG. 5.

At block 608, also in response to determining that someone is looking or gazing at the intelligent personal assistant, processor 400 may provide an indication to the user that the intelligent personal assistant has determined that the user is looking or gazing at the intelligent personal assistant, in order to provide feedback to the user that the user's gaze has been acknowledged by the intelligent personal assistant. Knowing this, a user may pause to receive the indication before speaking to the intelligent personal assistant. The indication may comprise, simply, of illuminating an LED located on top of the intelligent personal assistant, for example.

At block 610, processor 400 causes the audio recording to be sent from memory 402 to a remote server via network interface 404, to determine whether the audio recording contains human speech and, if so, what the user has said, again using techniques well-known in the art. In one embodiment, the audio recording is sent only when the location of the strongest audio signal from the microphone(s) matches the estimated location of a user via the visual information. This helps confirm that an actual question or command is being addressed to the intelligent personal assistant, rather than some random noise. In another embodiment, the audio recording is processed locally by processor 400 in order to determine whether the audio recording contains human speech and, if so, what the user has said.

At block 612, the remote server then sends a response back to the intelligent personal assistant with an audible response and/or it provides a command to another cloud-based server for an action to occur at the location of the intelligent personal assistant. For example, if the user's voice recording was interpreted by the remote server to "turn on the kitchen lights", the remote server may send a command to another server via the Internet that is capable of remotely controlling the kitchen lights at the user's home. When the other server receives the command, it in turn sends a signal over the wide-area network to a control device inside the home for the device to turn the kitchen lights on. In another embodiment, processor 400 sends an audible response to user output 412 and/or causes a signal to be transmitted via network interface 404 to other network-enabled devices or controllers, in order to perform such actions such as turning on/off lights, set thermostats, order goods online, etc.

At block 614, after a response has been provided to the user, processor 400 continues to evaluate, or have evaluated by the remote server, visual information from the camera in order to determine if the user is looking at the intelligent personal assistant. If so, blocks 604-612 are repeated.

Figure 7:
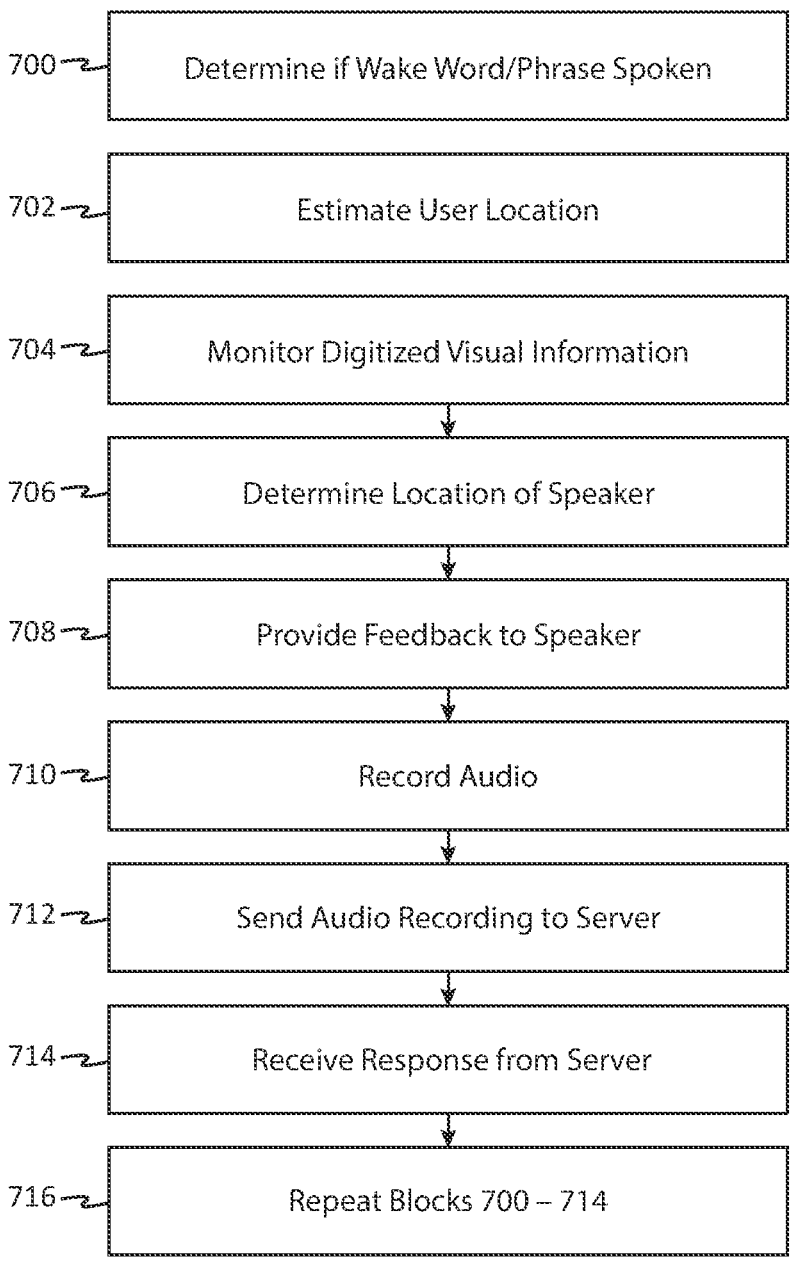
FIG. 7 is a flow diagram of yet another embodiment of a method, performed by an intelligent personal assistant as shown in FIG. 1, 2a, 2b, or 3, for interacting with a user in a more natural manner, using a combination of a wake word or phrase in combination with a determination that a user is addressing the intelligent personal assistant.

FIG. 7 is a flow diagram of yet another embodiment of a method, performed by an intelligent personal assistant as shown in FIG. 1, 2a, 2b, or 3, for interacting with a user in a more natural manner, using a combination of a wake word or phrase in combination with a determination that a user is addressing the intelligent personal assistant. This embodiment is useful to reduce the number of "false alarms" that may occur, for example, as a user is listening to a news or technical report describing an intelligent personal assistant. Often times, these reports audibly mention a key word or phrase in their discussions, which may cause a prior art intelligent personal assistant to react and, over a number of times, become annoying. It should be understood that the steps described in this method could be performed in an order other than what is shown and discussed and that some minor method steps may have been omitted for clarity and simplicity.

At block 700, processor 400 receives digitized audio information from the one or more microphones on the intelligent personal assistant and determines that the wake word or phrase was uttered by comparing the digitized audio information electronic to a wake word or phrase stored in memory 402, using techniques well-known in the art.

At block 702, processor 400 may estimate a location of a user who uttered the wake word/phrase in relation to the intelligent personal assistant, as described above in the description to the method illustrated in FIG. 5.

At block 704, processor 400 monitors digitized visual information from one or more digital cameras 408 to determine if anyone is addressing the intelligent personal assistant, as described above in the description to the method illustrated in FIG. 5

At block 706, processor 400 may determine a location of the user who is addressing the intelligent personal assistant using the digitized visual information, as explained above with respect to the method illustrated in FIG. 5.

At block 708, also in response to determining that someone is looking or gazing at the intelligent personal assistant, processor 400 may provide an indication to the user that the intelligent personal assistant has determined that the user is looking or gazing at the intelligent personal assistant, in order to provide feedback to the user that the user's gaze has been acknowledged by the intelligent personal assistant. Knowing this, a user may pause to receive the indication before speaking to the intelligent personal assistant. The indication may comprise, simply, of illuminating an LED located on top of the intelligent personal assistant, for example.

At block 710, in response to determining that a user uttered the wake word or phrase, and that someone is addressing the intelligent personal assistant, processor 400 begins recording audio information from the one or more microphones and stores the audio information in memory 402. It should be understood that blocks 700 and 702 could be reversed. That is, processor 400 may determine, first, that a user is addressing the intelligent personal assistant using the visual information and then determine that a wake word or phrase has been uttered. In one embodiment, the recording commences when the wake word/phrase is uttered within a predetermined time from when the intelligent personal assistant was addressed, for example, one second. In one embodiment, the recording continues only for as long as the personal intelligent assistant is being addressed. In another embodiment, the recording is terminated after processor 400, or a remote server, determines that a user has stopped speaking. In one embodiment, the recording is commenced only when the estimated location of the person who uttered the wake word/phrase matches the estimated location based on the visual information, or vice-versa, in order to better ensure that the same person who uttered the wake word/phrase is the same person who is addressing the intelligent personal assistant.

At block 712, processor 400 causes the audio recording to be sent from memory 402 to a remote server via network interface 404, to determine whether the audio recording contains human speech and, if so, what the user has said, again using techniques well-known in the art. In another embodiment, the audio recording is processed locally by processor 400 in order to determine whether the audio recording contains human speech and, if so, what the user has said.

At block 714, the remote server then sends a response back to the intelligent personal assistant with an audible response and/or it provides a command to another cloud-based server for an action to occur at the location of the intelligent personal assistant, as explained above with respect to the method illustrated in FIG. 5.

At block 716, after a response has been provided to the user, blocks 700-714 are repeated.

The methods or steps described in connection with the embodiments disclosed herein may be embodied directly in hardware or embodied in machine-readable instructions executed by a processor, or a combination of both. The machine-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components.

Accordingly, an embodiment of the invention may comprise a non-transitory processor-readable media embodying code or machine-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. An intelligent personal assistant, comprising:
a memory for storing processor-executable instructions;
a camera for generating digital images;
a microphone; and
a processor coupled to the memory, the camera and the microphone for executing the processor-executable instructions that causes the processor to:
receive, via the microphone, a voice input comprising a wake word and a query;
cause the wake word and the query to be processed;
receive, via the microphone, a second voice input;
determine, via the camera, that a person is addressing the intelligent personal assistant; and
cause the second voice input to be processed only when it is determined that the person is addressing the intelligent personal assistant within a predetermined time period from when the first voice input was received.

2. The intelligent personal assistant of claim 1, wherein the processor-executable instructions that causes the processor to determine that the person is addressing the intelligent personal assistant comprise instructions that causes the processor to:

determine, via the camera, that the person is gazing at the intelligent personal assistant.

3. The intelligent personal assistant of claim 2, wherein the processor-executable instructions that cause the processor to determine that the person is gazing at the intelligent personal assistant comprise instructions that causes the processor to:
determine, via the camera, the presence of a first eye, a second eye and a mouth of the person.

4. The intelligent personal assistant of claim 1, further comprising:
a reflective, convex surface positioned above the camera, for allowing the camera to view an area around the intelligent personal assistant;
wherein the camera is positioned inside the intelligent personal assistant pointing upwards towards the reflective, convex surface.

5. The intelligent personal assistant of claim 4, comprising further processor-executable instructions that causes the processor to:
apply an inverse function related to a curvature of the reflective, convex surface to the digital images to reduce visual distortion caused by the curvature.

6. A method performed by an intelligent personal assistant for interacting with a person, comprising:
receiving a voice input comprising a wake word and a query;
causing the wake word and the query to be processed;
receiving a second voice input;
determining that a person is addressing the intelligent personal assistant; and
causing the second voice input to be processed only when it is determined that the person is addressing the intelligent personal assistant within a predetermined time period from when the first voice input was received.

7. The method of claim 6, wherein the processor-executable instructions that causes the processor to determine that the person is addressing the intelligent personal assistant comprise instructions that causes the processor to:
determine, via the camera, that the person is gazing at the intelligent personal assistant.

8. The method of claim 7, wherein the processor-executable instructions that cause the processor to determine that the person is gazing at the intelligent personal assistant comprise instructions that causes the processor to:
determine, via the camera, the presence of a first eye, a second eye and a mouth of the person.

9. The method of claim 6, further comprising:
a reflective, convex surface positioned above the camera, for allowing the camera to view an area around the intelligent personal assistant;
wherein the camera is positioned inside the intelligent personal assistant pointing upwards towards the reflective, convex surface.

10. The method of claim 9, comprising further processor-executable instructions that causes the processor to:
apply an inverse function related to a curvature of the reflective, convex surface to the digital images to reduce visual distortion caused by the curvature.

* * * * *